H. G. DENNIS.
PRUNING SAW.
APPLICATION FILED MAR. 3, 1919.
1,319,571. Patented Oct. 21, 1919.
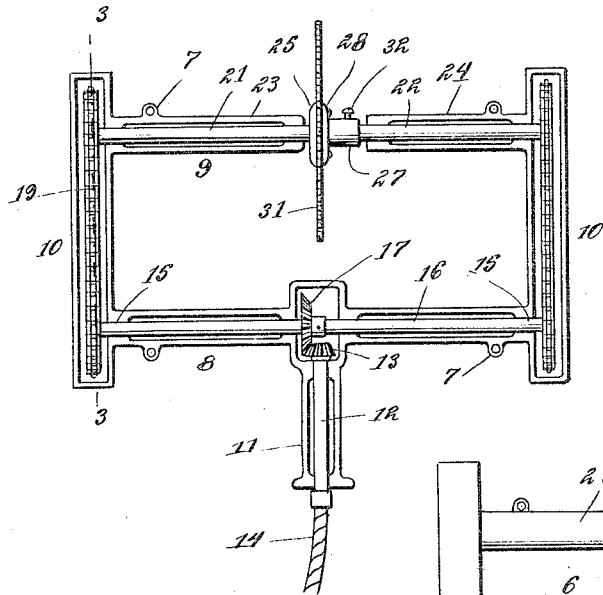
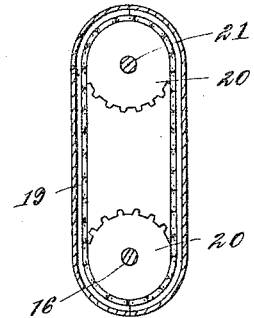
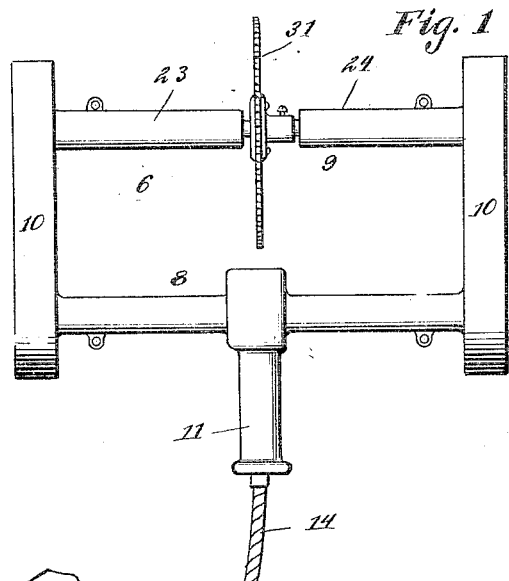
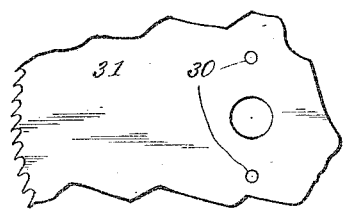
Inventor
Howard G. Dennis,
By Victor J. Evans
Attorney
Witnesses
C. F. Rudolph

UNITED STATES PATENT OFFICE.

HOWARD G. DENNIS, OF NORTH ADAMS, MICHIGAN.

PRUNING-SAW.

1,319,571.  Specification of Letters Patent.  Patented Oct. 21, 1919.

Application filed March 3, 1919. Serial No. 280,469.

*To all whom it may concern:*

Be it known that I, HOWARD G. DENNIS, a citizen of the United States, residing at North Adams, in the county of Hillsdale and State of Michigan, have invented new and useful Improvements in Pruning-Saws, of which the following is a specification.

This invention relates to an improved pruning implement.

In carrying out my invention it is my purpose to produce an implement for the pruning of fruit trees which shall be actuated expeditiously and in a convenient and easy manner by the operator.

It is also my purpose to produce a pruning device in which the cutting implement is in the nature of a rotary saw, and wherein novel means is provided for operating the saw.

Other objects and advantages will present themselves as the nature of the invention is more fully understood, reference being had to the accompanying drawings, in which, Figure 1 is a front elevation of a pruning implement constructed in accordance with the present invention.

Fig. 2 is a similar view, one of the members of the two part casing being removed.

Fig. 3 is a sectional view approximately on the line 3—3 of Fig. 2.

Fig. 4 is a detail sectional view illustrating the manner in which the saw will be clamped upon the shaft therefor, or removed from the said shaft.

Fig. 5 is a fragmentary elevation of the saw, illustrating the arrangement of the openings therein.

As disclosed by the drawings, the improvement contemplates the employment of a hollow substantially rectangular frame 6 which is constructed of some light material, and which is of a size and weight to permit of the ready handling thereof by the operator.

The frame 6 comprises two similar members, which, at suitable points are formed with outstanding ears or lugs 7 at the confronting edges of the members, and through these lugs are passed securing elements, in the nature of removable members, such as nuts and bolts. The frame comprises two spaced branches 8 and 9 respectively, and right angular branches 10 connecting the parallel branches 8 and 9. The branches 8 and 9, I will hereinafter refer to as the longitudinal members of the frame, and will also refer to the branch 8 as the inner member and the branch 9 as the outer member. The member 8 is centrally provided with an extension forming a handle 11 which is designed to be gripped by the operator so that the saw, (hereinafter to be referred to), may be conveniently brought to engage with the limbs of the tree to be pruned. The handle 11 is also hollow and in the bore thereof is arranged a shaft 12, the said shaft having its inner end provided with a beveled gear 13 arranged in the hollow and enlarged inner end of the handle. The shaft 12 has the end thereof extending through the handle connected with a flexible shaft 14, and this shaft 14 may be operated by any desired power. The inner member 8 of the frame is provided with suitable spaced bearings 15 for a longitudinally arranged shaft 16, the said shaft having centrally keyed thereto a pinion 17 that meshes with the pinion 13. The shaft 16 has its ends extended into the branches 10 of the frame 6 and has secured on its said ends, sprocket wheels, around which is trained endless sprocket chains 19, and these chains 19 are also trained over sprocket wheels 20 which are provided on the ends of a divided shaft journaled in suitable bearings in the outer member 9 of the frame. The sections of the outer shaft are indicated by the numerals 21 and 22 respectively, the outer member 9 of the frame also comprising two sections, indicated by the numerals 23 and 24 respectively. The outer end of the shaft 21 is preferably provided with a head 25, the outer face of which being flat, and the said head being formed with spaced openings 26. Upon the outer end of the shaft 22 is slidably arranged a sleeve 27 having its outer end provided with a head 28, the outer face of which being flat and the said sleeve, upon its said outer face is provided with extending studs 29 arranged to be received in the openings 26 of the head 25, and to also pass through openings 30 in the saw 31. The numeral 32 designates a binding element which passes through the sleeve 27 and frictionally contacts with the shaft 22 so as to lock the sleeve upon the shaft and in engagement with the saw 31. The saw is arranged between the confronting ends of the sections 23 and 24 of the frame, and by the arrangement above described, it will be noted that the saw may be readily secured to or removed from the device. All of the compartments are comparatively small in size and light in weight, so that the implement may be readily handled by the operator, the handle 11 may, of course, be of any desired length, whereby the implement may be operated from the ground, if desired, but in some instances, it is desirable that the handle 11 be comparatively short so as not to interfere with the operation of the implement when used in severing the lower branches of trees or in pruning trees of comparatively small heights. It is also believed that from the foregoing description, when taken in connection with the drawings, the construction, operation and advantages of the improvement will be perfectly apparent.

Having thus described the invention, what I claim is:

A pruning implement comprising a two-part hollow substantially rectangular frame, a handle on one of the longitudinal branches of the frame, a shaft journaled in the handle and having its inner end provided with a pinion, a flexible shaft connected to the first mentioned shaft, a shaft journaled in bearings in both the longitudinal branches of the frame, sprocket wheels on the ends of the said shafts, sprocket chains trained therearound, a pinion on one of the last mentioned shafts meshing with the pinion on the first mentioned shaft, and the outer longitudinal member of the frame comprising two spaced alining sections, and the shaft therein also comprising two alining sections, a head on one of the sections of the shaft having openings therein, a slidable sleeve on the other shaft having a head provided with lugs designed to be received in the openings in the head of the first mentioned shaft, a rotary saw having openings, spaced in the center thereof, and designed to receive the lugs on the head of the sleeve, and a binding element between the sleeve and the shaft upon which the saw is arranged.

In testimony whereof I affix my signature.

HOWARD G. DENNIS.

Copies of this patent may be obtained for five cents each, by addressing the "Commissioner of Patents, Washington, D. C."